May 11, 1965

J. F. CUBBAGE 3,183,490

CAPACITIVE FIXED MEMORY SYSTEM

Filed Dec. 31, 1962

INVENTOR:
JOHN. F. CUBBAGE
BY William C. Cahill
ATTORNEY

United States Patent Office 3,183,490

Patented May 11, 1965

3,183,490

CAPACITIVE FIXED MEMORY SYSTEM

John F. Cubbage, Phoenix, Ariz., assignor to General Electric Company, a corporation of New York Filed Dec. 31, 1962, Ser. No. 248,642
7 Claims. (Cl. 340—173)

The present invention pertains to a capacitive fixed memory, and more specifically, to a linear selection memory utilizing capacitive elements.

Linear selection memory arrays usually comprise a matrix of memory elements each positioned to enable the element to be addressed in parallel with predetermined other elements of the matrix. A binary word comprising a plurality of binary digits is stored in a row or column of the linear selection matrix array in the form of the presence or absence of binary digits. The linear selection memory may be read by addressing an entire column or row of storage elements simultaneously, and detecting the binary 1's and 0's in the respective bit positions of the stored binary word. This parallel reading of the contents of the memory is one of the advantages of a linear selection matrix memory.

In a linear selection memory utilizing capacitive elements as permanent storage devices for binary digits, the presence or absence of capacitive coupling between a sense and drive conductor determines the existence of a binary 1 or a 0. The utilization of capacitive elements permits high speed addressing and readout of the memory array. However, the high speed switching involved may limit the voltage levels used. Accordingly, problems are encountered wherein ground noise may reduce the signal-to-noise ratio and thereby reduce the effectiveness of the capacitive array.

Accordingly, it is an object of the present invention to provide an improved capacitive fixed memory system.

It is a further object of the present invention to improve the signal-to-noise ratio of capacitive fixed memory arrays by making the signal derived from reading the array nearly independent of ground noise.

It is a further object of the present invention to provide a capacitive fixed memory array having a load on each drive circuit that is not a function of the stored information.

Further objects and advantages of the present invention will become apparent to those skilled in the art as the description thereof proceeds.

Briefly stated, in accordance with one embodiment of the present invention, a capacitive fixed memory array is provided utilizing a sheet of insulating material having drive conductors on one side and pairs of sense conductors on the opposite side thereof. The drive conductors and sense conductors are arranged to form a grid. Capacitive elements or "pads" are positioned to capacitively couple each drive conductor to a selected one of each pair of sense conductors. The sense conductors are connected to differential voltage detecting means such as differential amplifiers to thereby detect voltage differences existing between the sense conductors of each pair of sense conductors.

Thus, when a read pulse is applied to a designated drive conductor, the pulse will be capacitively coupled to one of the two sense conductors in each pair of sense conductors, and the differential amplifier will provide an output signal that will be initially positive or initially negative depending on the convention used for the binary system.

The invention, both as to its organization and operation together with further objects and advantages thereof may best be understood by reference to the following description taken in connection with the accompanying drawings in which.

Figure 1:
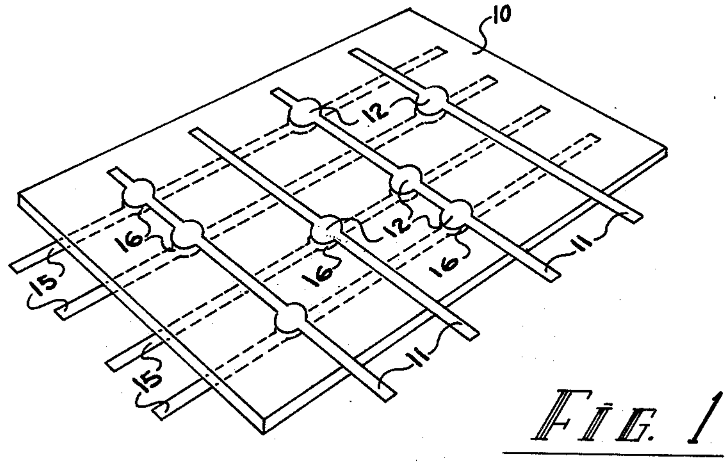
FIG. 1 is a perspective view of a sample capacitive fixed memory useful for describing the present invention.

Referring to FIG. 1, a sheet of insulating material 10 is provided with a plurality of drive conductors 11. These drive conductors are thin, narrow ribbons of conductive material lying flat on the upper surface of the insulating material 10. Each of the drive conductors 11 is provided with portions of increased area 12 which may be termed capacitive "pads." The pads 12 are of substantially greater area than the corresponding length of the drive conductor. The conductors 11 and the pads 12 may be placed on the insulating sheet 10 by any conventional means such as, for example, electro-deposition, etching, plating, etc.

The sheet of insulating material 10 is also provided with a plurality of sensing conductors 15 placed on the opposite side from the drive conductors 11. The sensing conductors 15, in a manner similar to the drive conductors 11, have capacitive pads 16 positioned opposite corresponding capacitive pads 12 of the drive conductors 11. The capacitive pads on the top and bottom of the sheet of insulating material 10 form pairs which may be considered equivalent to the plates of capacitors. Thus, an electrical pulse applied to one of the drive conductors 11 will be capacitively coupled to the sensing conductors 15 having pads 16 positioned opposite corresponding pads 12 of the drive conductor. Since the area of the pads is substantially greater than the area of the corresponding length of individual conductors, the capacity existing between the conductors on one side of the sheet 10 and the other side of the sheet 10 is small in comparison to the capacity between pads of a pair.

Figure 2:
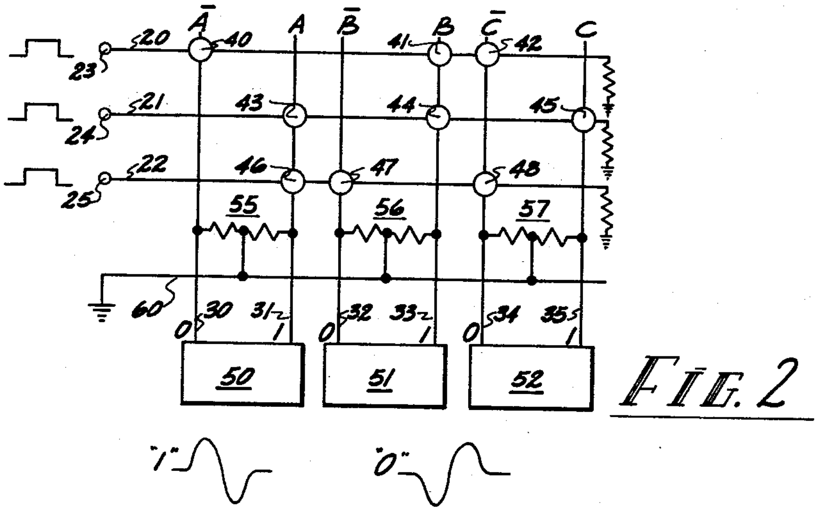
FIG. 2 is a schematic drawing of a capacitive fixed memory system constructed in accordance with the teachings of the present invention.

Referring to FIG. 2, a capacitive fixed memory system, constructed in accordance with the teaching of the present invention, is shown. For convenience, the drive and sense conductors are illustrated merely as lines, and the capacitive pads are illustrated by circles. It will be understood that the sense conductors and drive conductors are separated by a sheet of insulating material and each of the circles shown in FIG. 2 represent a pair of capacitive pads, one on the top, and one on the bottom of the insulating sheet.

A plurality of drive conductors 20, 21, and 22 are shown connected to corresponding input terminals 23, 24, and 25, respectively. These input terminals may be connected to any convenient read pulse source to provide a pulse for capacitive coupling. Representative voltage pulses are illustrated next to each of the input terminals 23, 24 and 25.

A plurality of pairs of sense conductors 30–31, 32–33, and 34–35, are arranged on the opposite side of the insulating sheet to form a grid with the drive conductors 20, 21, and 22. In the embodiment shown in FIG. 2, the pairs of sense conductors are arranged in an orthogonal relationship to the drive conductors. It may be noted that it is unnecessary for the grid, formed by the drive and sense conductors, to be formed by arranging the conductors on opposite sides of the insulating sheet perpendicular to each other. The drive and sense conductors may be placed at an angle other than ninety degrees to each other to form a grid; similarly, the conductors may be curvilinear, thus forming a grid with curved or irregular segments.

Each pair of sense conductors is associated with a binary digit to be permanently stored in the memory. For example, sense conductors 30 and 31 are associated with the binary digit A; the sense conductor 30 may be designated the $\overline{A}$ sense conductor, and the sense conductor 31 may be designated the A sense conductor. Similarly, sense conductors 32 and 33 are associated with the binary digits $\overline{B}$ and B, respectively, and sense conductors 34 and 35 are associated with the binary digits $\overline{C}$ and C, respectively.

A pair of capacitive pads 40 is placed at the crossing of the drive conductor 20 and the sense conductor 30. One of the pair of pads 40 is connected to the drive conductor 20 and the other of the pair of pads 40 is connected to the sense conductor 30. It may therefore be said that the binary digit $\overline{A}$ is stored in this position of the memory system. Similarly, a pair of capacitive pads 41 may be placed at the crossing of the drive conductor 20 and the sense conductor 33 to indicate that the binary digit B is stored in that location. Accordingly, pairs of capacitive pads 42–48 are positioned at the crossing of corresponding drive conductors and sense conductors. The capacitive pads are placed in either a binary 0 position (i.e., $\overline{A}$, $\overline{B}$, $\overline{C}$) or a binary 1 position (i.e., A, B, C). Thus, a capacitive pad will be connected to one sense conductor of each pair of sense conductors for each binary digit to be stored.

Differential amplifiers 50, 51, and 52 are provided for detecting voltage differences between sense conductor pairs 30–31, 32–33, and 34–35, respectively. To minimize cross coupling between sense conductors, a low impedance-to-ground termination may be provided in each sense conductor pair such as that shown at 55, 56, and 57, respectively. Each of these low impedance-to-ground terminations connects the corresponding sense conductor pair through a low resistance path to a grounded conductor 60.

Figure 3:
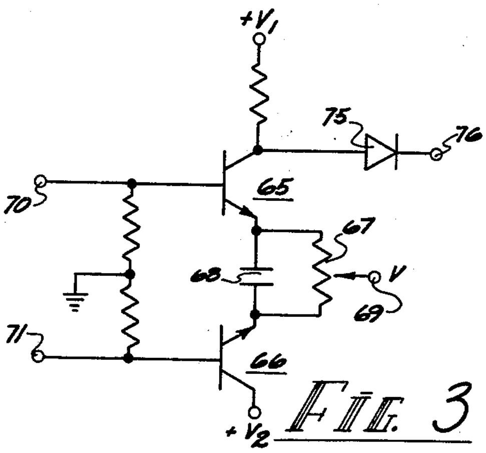
FIG. 3 is a circuit diagram of a representative differential amplifier that may be used in the capacitive fixed memory system of FIG. 2.

Referring to FIG. 3, the circuit diagram of a representative differential amplifier is shown. The differential amplifier of FIG. 3 may be utilized as the differential amplifiers 50, 51, and 52 of FIG. 2. The differential amplifier of FIG. 3 comprises two transistors 65 and 66 emitter-connected to a balancing network comprising a parallel resistor 67 and capacitor 68. The resistor 67 is provided with an adjustable contact 69 connected to a source of bias potential —V. Positive bias is provided for the transistors at the respective collector electrodes thereof. Input terminals 70 and 71 are connected to the respective base electrodes of the two transistors. The base circuits of each transistor is connected through an appropriately balanced resistor load to ground.

The input terminals 70 and 71 may be connected to the two sense conductors of a pair of sense conductors. Under quiescent conditions (i.e., no difference in voltage between the input terminals) current flows through both transistors, and the voltage existing at the collector electrode of transistor 65 is at a predetermined nominal level. If the voltage existing at both input terminals 70 and 71 simultaneously rises, both transistors tend to become increasingly forward biased; however, since the emitter circuits of the two transistors are the same, any increase in conduction in one transistor tends to reduce conduction in the other. Consequently, the net current flow in the collector circuit of transistor 65 remains constant, and the voltage does not change.

If one of the input terminals 70–71 experiences a voltage rise relative to the other, the corresponding transistor will increase conduction causing the other to decrease conduction. The collector electrode of transistor 65 may therefore experience a voltage rise or drop depending on which of the input terminals experiences the higher voltage. The voltage occurring at the collector electrode of transistor 65 may conveniently be further amplified by any conventional amplifier illustrated in FIG. 3 at 75. Accordingly, the voltage wave form provided at terminal 76 may represent either a binary 1 or a binary 0 depending on which of the sense conductors connected to the input terminals receives a voltage pulse coupled thereto through a capacitive pad. Representative wave forms of the binary 1 and 0 are shown in FIG. 2.

The operation of the capacitive fixed memory system shown in FIG. 2 is as follows. When a read pulse is applied to the terminal 23 and the drive conductor 20, a voltage pulse is capacitively coupled through the pairs of pads 40, 41, and 42. This voltage pulse is thus coupled to the sense conductors 30, 33, and 34, respectively. Differential amplifier 50 therefore experiences a voltage rise on sense conductor 30 relative to sense conductor 31; similarly, differential amplifier 51 experiences a voltage rise in sense conductor 33 relative to sense conductor 32, and differential amplifier 52 experiences a voltage rise in sense conductor 34 relative to sense conductor 35. Since capacitive pads 40 represent $\overline{A}$, or represent a binary 0 for the binary digit A, the $\overline{A}$ sense conductor, or sense conductor 30, will cause the differential amplifier 50 to provide an output pulse that will initially be negative-going. Conversely, capacitive pad pair 41 was positioned at the crossing of the drive conductor 20 and sense conductor 33 indicating that the binary digit B is a binary 1. Accordingly, the result of applying a read pulse to the input terminal 23 and drive conductor 20 is the production of three output signals, one from each of the differential amplifiers 50, 51, and 52, indicating the stored information in the top row of the matrix to be a binary word comprising three binary digits $\overline{A}$, B, $\overline{C}$, or 010.

A read pulse applied to input terminal 24 and drive conductor 21 results in the capacitive coupling through capacitive pad pairs 43, 44, and 45 to sense conductors 31, 33, and 35, respectively. Accordingly, the input signal to the drive conductor 21 results in the output from the differential amplifiers 50, 51, and 52 of the three digit binary word ABC or 111. Similarly, an input pulse to the terminal 25 and drive conductor 22 results in the capacitive coupling of the pulse through pad pairs 46, 47, and 48 to sense conductors 31, 32, and 34, respectively. The binary word represented by the position of the capacitive pad pairs on the drive conductor 22 is $A\overline{BC}$ or 100.

It may be noted that each of the drive conductors has the exact same number of capacitive pads connected to it. Therefore, the impedance presented to the drive circuit connected to the input terminal 23 will always remain the same regardless of the binary word stored in that position of the memory. Further, the differential voltage applied to the differential amplifiers will always be the difference in the capacitive coupling of a capacitive pad pair and the capacitive coupling incident to the proximity of the drive conductor and the sense conductor. Thus, regardless of the information stored in the memory, a read pulse may be applied to the memory at any desired drive conductor position while the input impedance of that drive conductor will be the same as all other drive conductors. The output pulses resulting from the read pulse will remain the difference between the capacitive coupling of the capacitive pad pair and the capacitive coupling of an unpadded conductor crossing. Thus, the output signal provided by the pair of sense conductors to the differential amplifier will be the same regardless of which drive conductor is being pulsed, and only the polarity of the output pulse will be changed in accordance with the stored information. Thus, a linear capacitive fixed memory is provided by the present invention that may be utilized at high rates of addressing with a low signal-to-noise ratio, a constant load on each driving circuit, and a minimum of cross coupling.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to secure by Letters Patent of the United States is:

1. A capacitive fixed memory comprising, a sheet of insulating material, a plurality of drive conductors on one side of said sheet, a plurality of pairs of sense conductors on the opposite side of said sheet and arranged to cross said drive conductors to thereby form a grid with said drive conductors, a single pair of capacitive pads associated with the crossing of each of said drive conductors with each of said pairs of sense conductors, the individual pads of said pair of pads arranged on opposite sides of said sheet of insulating material and positioned opposite each other to form a capacitive coupling, one pad of said pair of pads connected to the drive conductor, the other pad of said pair of pads connected to one sense conductor of the pair of sense conductors, and means connected to each pair of sense conductors for detecting voltage differences between the sense conductors of each pair.

2. A capacitive fixed memory comprising, a sheet of insulating material, a plurality of drive conductors on one side of said sheet, a plurality of pairs of sense conductors on the opposite side of said sheet and arranged perpendicular to said drive conductors whereby said drive conductors and said sense conductors form a crossing grid, a plurality of pairs of capacitive pads, a single pair of said pads associated with each crossing of one of said drive conductors with a pair of said sense conductors to thereby represent a single binary digit, the individual pads of each pair of pads arranged on opposite sides of said sheet of insulating material and positioned opposite each other to form a capacitive coupling, one pad of each pair of pads connected to one of said drive conductors, the other pad of each pair of pads connected to one sense conductor of a pair of sense conductors, and means connected to each pair of sense conductors for detecting voltage differences between the sense conductors of each pair.

3. A capacitive fixed memory comprising, a sheet of insulating material, a plurality of parallel drive conductors on one side of said sheet, a plurality of parallel pairs of sense conductors on the opposite side of said sheet arranged perpendicular to said drive conductors and forming a crossing grid with said drive conductors, a plurality of pairs of capacitive pads, a single pair of said pads associated with each crossing of said drive conductors with each of said pairs of sense conductors, the individual pads of each pair of pads arranged on opposite sides of said sheet of insulating material and positioned opposite each other to form a capacitive coupling, one pad of each pair of pads connected to one of said drive conductors, the other pad of each pair of pads connected to one sense conductor of a pair of sense conductors, and a differential amplifier connected to each pair of sense conductors for detecting voltage differences between the sense conductors of each pair.

4. A capacitive fixed memory comprising, a sheet of insulating material, a plurality of drive conductors on one side of said sheet, a plurality of pairs of sense conductors on the opposite side of said sheet and arranged to cross and form a grid with said drive conductors, a single pair of capacitive pads associated with the crossing of each of said drive conductors with each of said pairs of sense conductors, the individual pads of each pair of pads arranged on opposite sides of said sheet of insulating material and positioned opposite each other to form a capacitive coupling, one pad of each pair of pads connected to one of said drive conductors, the other pad of each pair of pads connected to one sense conductor of a pair of sense conductors, means connected to each pair of sense conductors for detecting voltage differences between the sense conductors of each pair, and means connecting each sense conductor through a low impedance path to ground.

5. A capacitive fixed memory comprising, a sheet of insulating material, a plurality of drive conductors on one side of said sheet, a plurality of pairs of sense conductors on the opposite side of said sheet and arranged perpendicular to said drive conductors whereby said drive conductors and said sense conductors form a crossing grid, a plurality of pairs of capacitive pads, a single pair of said pads associated with each crossing of one of said drive conductors with a pair of said sense conductors to thereby represent a single binary digit, the individual pads of each pair of pads arranged on opposite sides of said sheet of insulating material and positioned opposite each other to form a capacitive coupling, one pad of each pair of pads connected to one of said drive conductors, the other pad of each pair of pads connected to one sense conductor of a pair of sense conductors, means connected to each pair of sense conductors for detecting voltage differences between the sense conductors of each pair, and means connecting each sense conductor through a low impedance path to ground.

6. A capacitive fixed memory comprising, a sheet of insulating material, a plurality of parallel drive conductors on one side of said sheet, a plurality of parallel pairs of sense conductors on the opposite side of said sheet arranged perpendicular to said drive conductors to thereby form a crossing grid with said drive conductors, a single pair of capacitive pads associated with each crossing of said drive conductors with each pair of said sense conductors, the individual pads of each pair of pads arranged on opposite sides of said sheet of insulating material and positioned opposite each other to form a capacitive coupling, one pad of each pair of pads connected to one of said drive conductors, the other pad of each pair of pads connected to one sense conductor of a pair of sense conductors, a differential amplifier connected to each pair of sense conductors for detecting voltage differences between the sense conductors of each pair, and means connecting each sense conductor through a low impedance path to ground.

7. A capacitive memory comprising: a sheet of insulating material; a plurality of drive conductors on one side of said sheet, said drive conductors extending in a first direction; a plurailty of pairs of sense conductors on the other side of said sheet, said pairs of sense conductors extending in a direction transverse to that of said drive conductors whereby said drive conductors and said sense conductors form a crossing grid, the crossing of a single drive conductor with one of said pairs of sense conductors corresponding to a single binary digit; a plurality of pairs of capacitive pads, the individual pads of each pair of pads arranged on opposite sides of said sheet of insulating material, one pad of each pair of pads connected to one of said drive conductors, the other pad of each pair of pads connected to one conductor of a pair of sense conductors, the drive conductor and the pair of sense conductors corresponding to a binary digit having only one pair of capacitive pads; and means connected to each pair of sense conductors for detecting voltage differences between the sense conductors of each pair.

References Cited by the Examiner

UNITED STATES PATENTS

| | | | |
|---|---|---|---|
| 3,003,143 | 10/61 | Beurrier | 340—173 |
| 3,046,487 | 7/62 | Matzen et al. | 330—30 X |
| 3,077,566 | 2/63 | Vosteen | 330—30 X |
| 3,077,591 | 2/63 | Akmenkalns et al. | 340—173 X |

IRVING L. SRAGOW, *Primary Examiner.*